United States Patent
Morita

(10) Patent No.: US 8,384,943 B2
(45) Date of Patent: Feb. 26, 2013

(54) IMAGE PROCESSING APPARATUS, CONTROL METHOD OF IMAGE PROCESSING APPARATUS, AND STORAGE MEDIUM FOR MANAGING IMAGES IN A MULTI-IMAGE FILE

(75) Inventor: Naoki Morita, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 107 days.

(21) Appl. No.: 12/922,976

(22) PCT Filed: Jun. 17, 2010

(86) PCT No.: PCT/JP2010/004061
§ 371 (c)(1),
(2), (4) Date: Sep. 16, 2010

(87) PCT Pub. No.: WO2011/001623
PCT Pub. Date: Jan. 6, 2011

(65) Prior Publication Data
US 2011/0134484 A1 Jun. 9, 2011

(30) Foreign Application Priority Data
Jun. 30, 2009 (JP) ................................. 2009-155306

(51) Int. Cl.
*G06K 15/00* (2006.01)
*G06F 3/12* (2006.01)
(52) U.S. Cl. .................... 358/1.16; 358/1.15; 358/1.13; 358/1.17

(58) Field of Classification Search .................. None
See application file for complete search history.

(56) References Cited

U.S. PATENT DOCUMENTS

| | | | |
|---|---|---|---|
| 2002/0196459 A1* | 12/2002 | Kadowaki | 358/1.14 |
| 2005/0172219 A1* | 8/2005 | Hintermeister et al. | 715/513 |
| 2009/0154833 A1* | 6/2009 | Sakaue et al. | 382/282 |
| 2009/0226088 A1* | 9/2009 | Okazawa | 382/173 |
| 2010/0158410 A1* | 6/2010 | Kusakabe | 382/284 |
| 2010/0265545 A1* | 10/2010 | Ikeda | 358/1.15 |

FOREIGN PATENT DOCUMENTS
JP 2001-243490 9/2001

* cited by examiner

*Primary Examiner* — Ming Hon
(74) *Attorney, Agent, or Firm* — Fitzpatrick, Cella, Harper & Scinto

(57) ABSTRACT

It enables even by an image forming apparatus which does not have a function to recognize an image other than a leading image included in a multi-image file to print the image other than the leading image. To do so, there is provided a control method which comprises: outputting the image included in the multi-image file of a format in which the leading image can be processed by an image processing apparatus which does not deal with the multi-image file but an image other than the leading image cannot be processed by the image processing apparatus which does not deal with the multi-image file; and replacing, in a case where an output instruction to output, among the plural images included in the multi-image file, the image other than the leading image has been accepted, the image to which the output instruction has been accepted with the leading image.

7 Claims, 14 Drawing Sheets

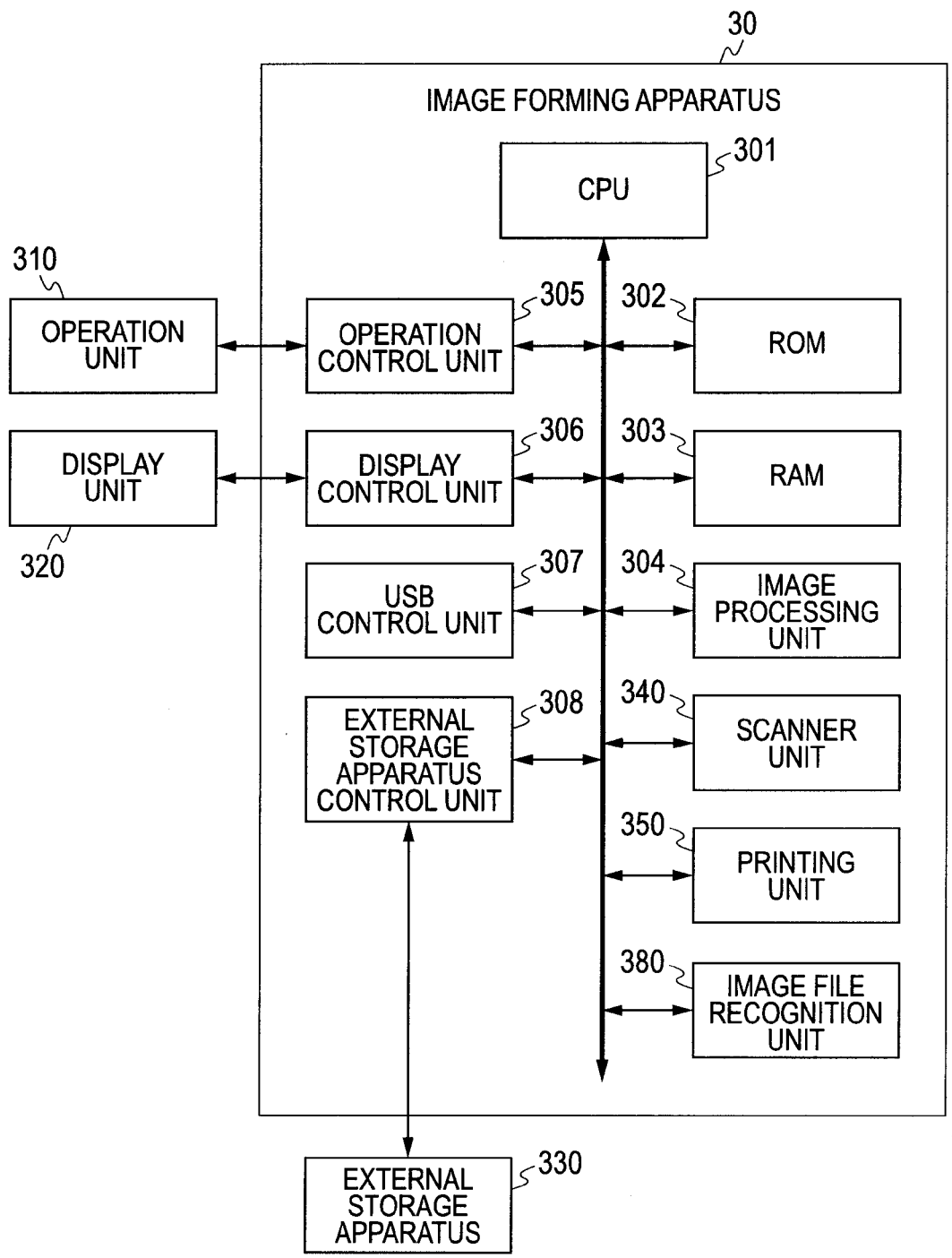

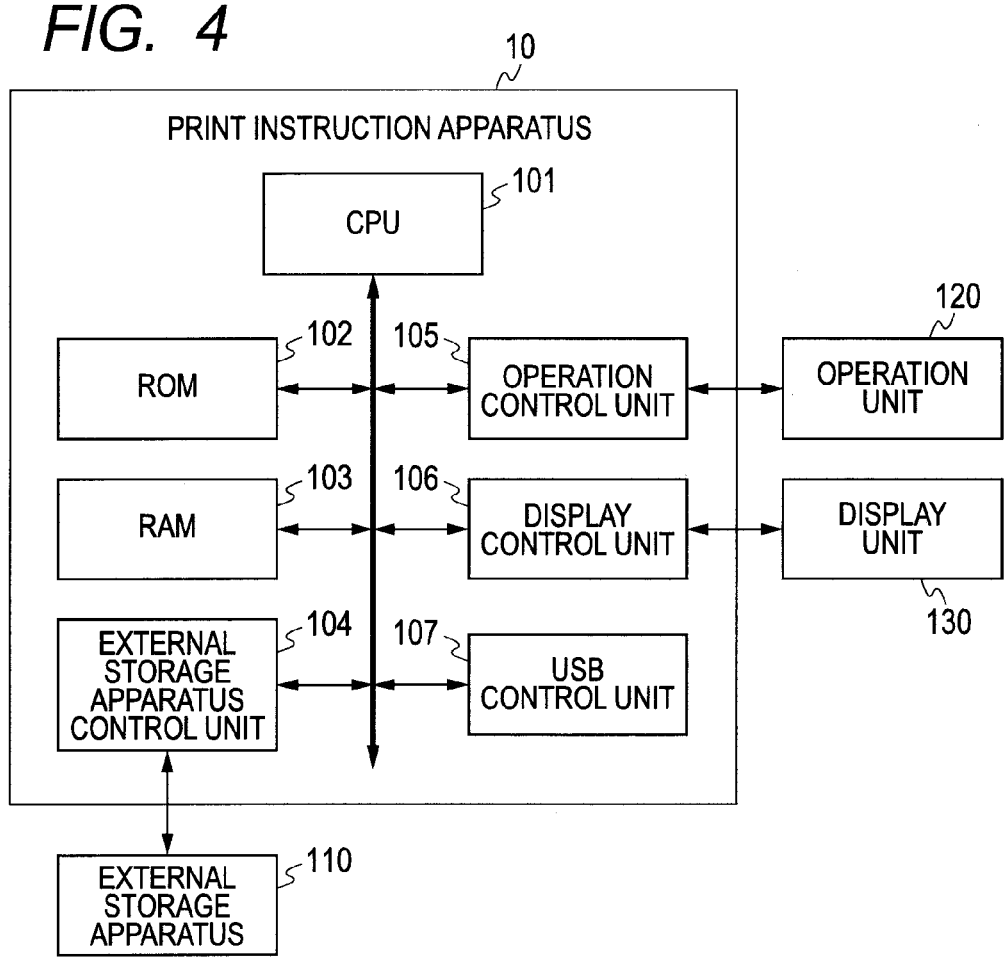
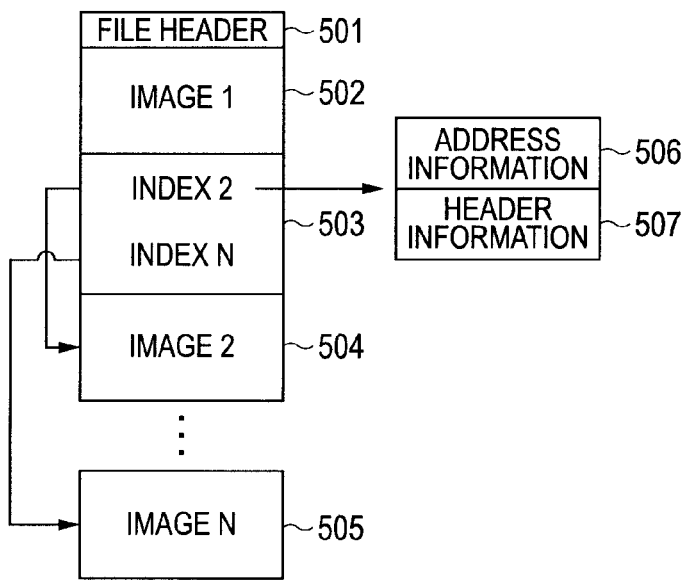

FIG. 9

PROCESS OF IMAGE FILES

| ● | 20080101_1.pic |
| ○ | 20080101_2.pic |
| ○ | 20080101_3.pic |
| ○ | 20080102_4.pic |
| ○ | 20080102_5.pic |
| ○ | 20080103_6.pic |

PRINT SELECTED FILE          DISPLAY SELECTED FILE

CANCEL          OK

FIG. 10

PROCESS OF IMAGE FILES

20080101_2

| ● | image01 |
| ○ | image02 |
| ○ | image03 |
| ○ | image04 |
| ○ | image05 |

PRINT SELECTED FILE          DISPLAY SELECTED FILE

CANCEL          OK

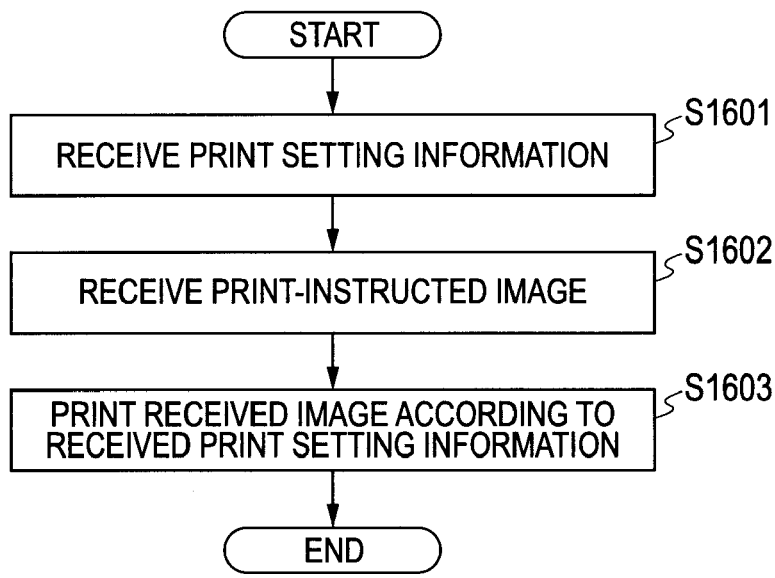
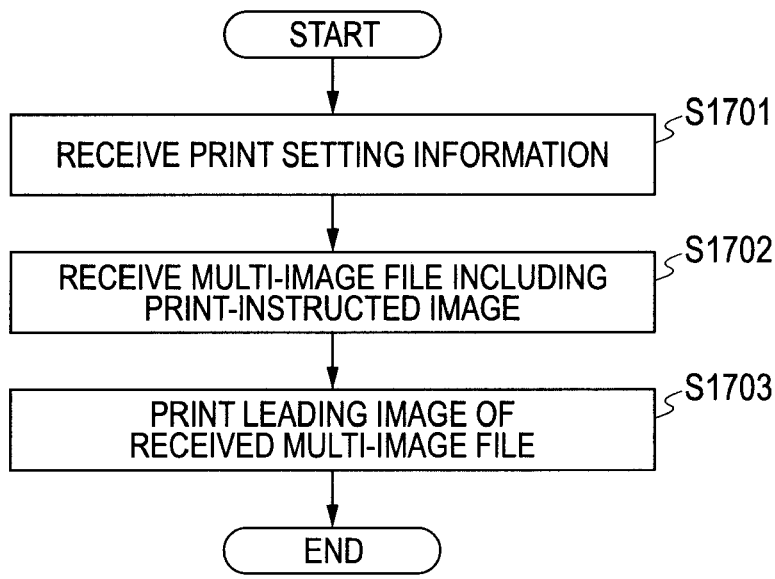

IMAGE PROCESSING APPARATUS, CONTROL METHOD OF IMAGE PROCESSING APPARATUS, AND STORAGE MEDIUM FOR MANAGING IMAGES IN A MULTI-IMAGE FILE

TECHNICAL FIELD

The present invention relates to an image processing apparatus, a control method of the image processing apparatus, and a storage medium for storing a program of causing a computer to perform the control method of the image processing apparatus.

BACKGROUND ART

Conventionally, there is an image processing apparatus which reads an image included in an image file stored in a storage medium such as a memory stick or the like, and outputs the read image.

Conventionally, there is an image processing apparatus which reads an image included in an image file stored in a storage medium such as a memory stick or the like, and outputs the read image.

In case of outputting the image by using the image processing apparatus like this, a user first connects the storage medium, in which the image file has been stored, to the image processing apparatus, designates from an operation panel the image file stored in the connected storage medium, and then issues a print instruction or a transmission instruction so as to output the image.

CITATION LIST

Patent Literature

PTL 1: Japanese Patent Application Laid-Open No. 2001-243490

Further, there is conventionally one image file which includes plural images (see Patent Literature 1). If the image file like this is used, for example, it is possible to easily manage the plural images by storing the mutually associated plural images as one image file.

However, in conventional image processing apparatuses, there are image processing apparatuses which do not have any function to correctly recognize plural images included in suchlike image file. Thus, by using this kind of image processing apparatus, it is difficult to output the plural images included in the image file.

More specifically, in a case where the image processing apparatus which has the function to recognize the plural images included in the image file is used, the image processing apparatus reads the image file from the connected storage medium, and analyzes the file header of the read image file. Thus, the image processing apparatus can recognize the respective images included in the image file by identifying the reading positions of the respective images included in the image file on the basis of the results of such analysis.

On the other hand, in a case where the image processing apparatus which does not have the function to recognize the plural images included in the image file is used, the image processing apparatus reads the image file from the connected storage medium, and analyzes the file header of the read image file. Thus, the image processing apparatus can recognize one image (i.e., a leading image) included in the image file on the basis of the results of such analysis. However, in this case, the image processing apparatus cannot recognize the images other than the leading image.

SUMMARY OF INVENTION

Technical Problem

The present invention has been completed to solve such a conventional problem as described above, and is characterized by an image processing apparatus comprising: an outputting unit configured to output an image included in a multi-image file of a format in which a leading image can be processed by an image processing apparatus which does not deal with the multi-image file but an image other than the leading image cannot be processed by the image processing apparatus which does not deal with the multi-image file; and a control unit configured to, in a case where an output instruction to output, among the plural images included in the multi-image file, the image other than the leading image by the outputting unit has been accepted, replace the image to which the output instruction has been accepted with the leading image.

Further features of the present invention will become apparent from the following description of exemplary embodiments with reference to the attached drawings.

BRIEF DESCRIPTION OF DRAWINGS

FIG. 3 is a block diagram illustrating a constitution of an image forming apparatus 30 according to the embodiment of the present invention.

FIG. 4 is a block diagram illustrating a constitution of a print instruction apparatus 10 according to the embodiment of the present invention.

FIG. 5 is a diagram for describing a multi-image file according to the embodiment of the present invention.

FIG. 9 is a diagram for describing an operation screen according to the embodiment of the present invention.

FIG. 10 is a diagram for describing an operation screen according to the embodiment of the present invention.

FIG. 16 is a flow chart indicating a flow of a process according to the embodiment of the present invention.

FIG. 17 is a flow chart indicating a flow of a process according to the embodiment of the present invention.

DESCRIPTION OF EMBODIMENTS

Hereinafter, best modes for carrying out the present invention will be described with reference to the attached drawings.

First Embodiment

An image forming system which is an example of an image processing system according to a first embodiment of the present invention will be described with reference to the attached drawings.

Figure 1:
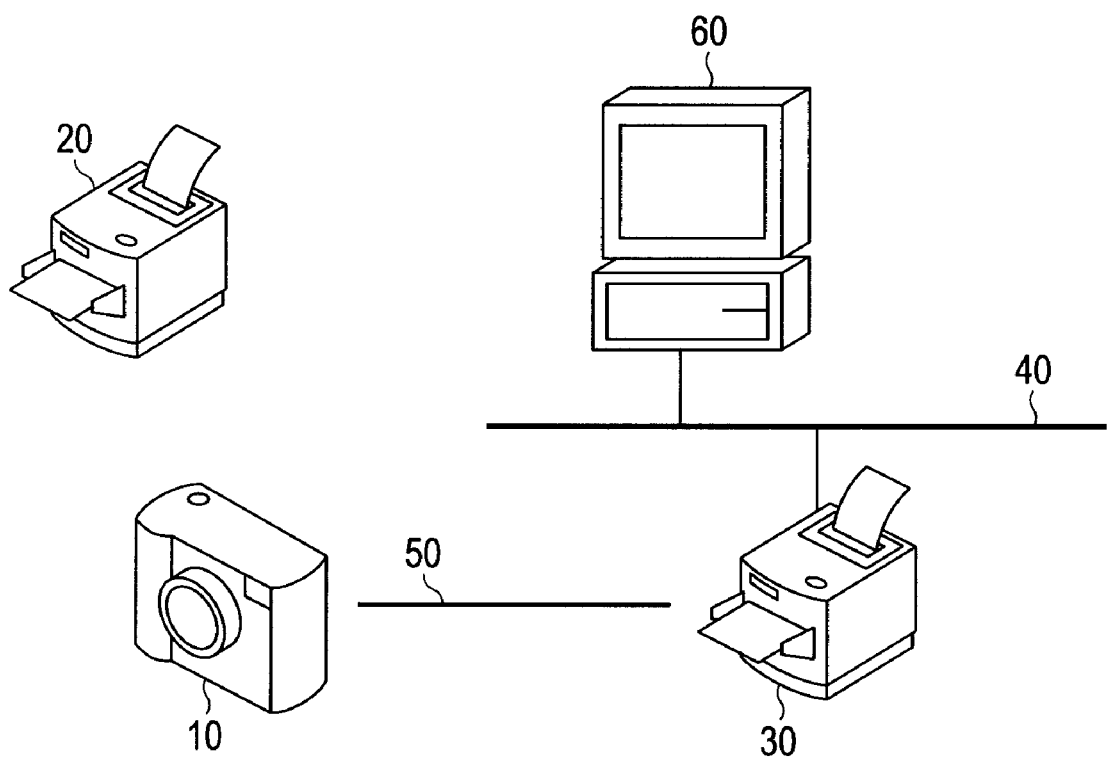
FIG. 1 is a diagram illustrating a print system according to the embodiment of the present invention.

FIG. 1 is a diagram illustrating a configuration of the image forming system (i.e., a print system) according to the first embodiment of the present invention.

An image forming apparatus 20, which is an example of an image processing apparatus, is, for example, an MFP (multi functional peripheral).

The image forming apparatus 20 receives image data from a PC (personal computer), performs printing based on the received image data, and transmits image data.

Further, the image forming apparatus 20 has a scanner which reads an image of an original set on an original board, and stores in its memory the read image as a file having a predetermined format such as a JPEG (Joint Photographic Experts Group) format or the like. Besides, a storage medium such as a USB (Universal Serial Bus) memory or the like can be connected to the image forming apparatus 20. Thus, the image forming apparatus 20 reads a file stored in the connected USB memory, and performs printing based on the read file.

Further, the image forming apparatus 20 has a multi-image recognition unit which interprets a file header of a certain-format file including plural images (hereinafter, called a multi-image file). Thus, the multi-image recognition unit can correctly recognize plural images included in the multi-image file. For example, if an instruction for previewing the images included in the multi-image file is accepted from a user, the image forming apparatus 20 can display the plural images included in the multi-image file on an operation panel of the image forming apparatus 20. Here, as a method of displaying the plural images in this case, a method of arranging and displaying the plural images may be adopted. Alternatively, a method of displaying the plural images one by one in response to a display changeover instruction by the user may be adopted.

Furthermore, in response to an instruction from the user, the image forming apparatus 20 prints or transmits, to a designated destination, an arbitrary image among the plural images included in the multi-image file.

Alternatively, in response to an instruction from the user, the image forming apparatus 20 transfers the file stored in its memory to the USB memory connected to the image forming apparatus 20 and stores the transferred file in the connected USB memory.

An image forming apparatus 30 has the constitution substantially the same as that of the image forming apparatus 20. However, unlike the image forming apparatus 20, the image forming apparatus 30 does not have a multi-image recognition unit for recognizing the plural images included in the multi-image file. For this reason, the image forming apparatus 30 can recognize only the leading image among the plural images included in the multi-image file. Here, it should be noted that the leading image is the image existing at a position of which the address value is least as compared with the address values of other images existing at other positions in a case where the multi-image file is stored in the memory.

A PC 60 creates an image by using application software and the like, and stores the created image in its memory. Further, the PC 60 transmits the stored image to the image forming apparatus 30 through a network 40.

A print instruction apparatus 10, which is, e.g., a digital camera, generates image data obtained by shooting as a file. More specifically, the print instruction apparatus 10 acting as the digital camera stores in its memory one shot image as one file together with a file header including a shooting date and hour, an automatically generated file name, and the like. Further, the print instruction apparatus 10 has a sequential shooting function, and stores plural images sequentially shot by using the sequential shooting function in its memory as one multi-image file. At this time, the print instruction apparatus 10 inserts, in the multi-image file, information indicating that the file to be stored is the multi-image file, head addresses of the respective images among the sequentially shot plural images, and the like.

Figure 2:
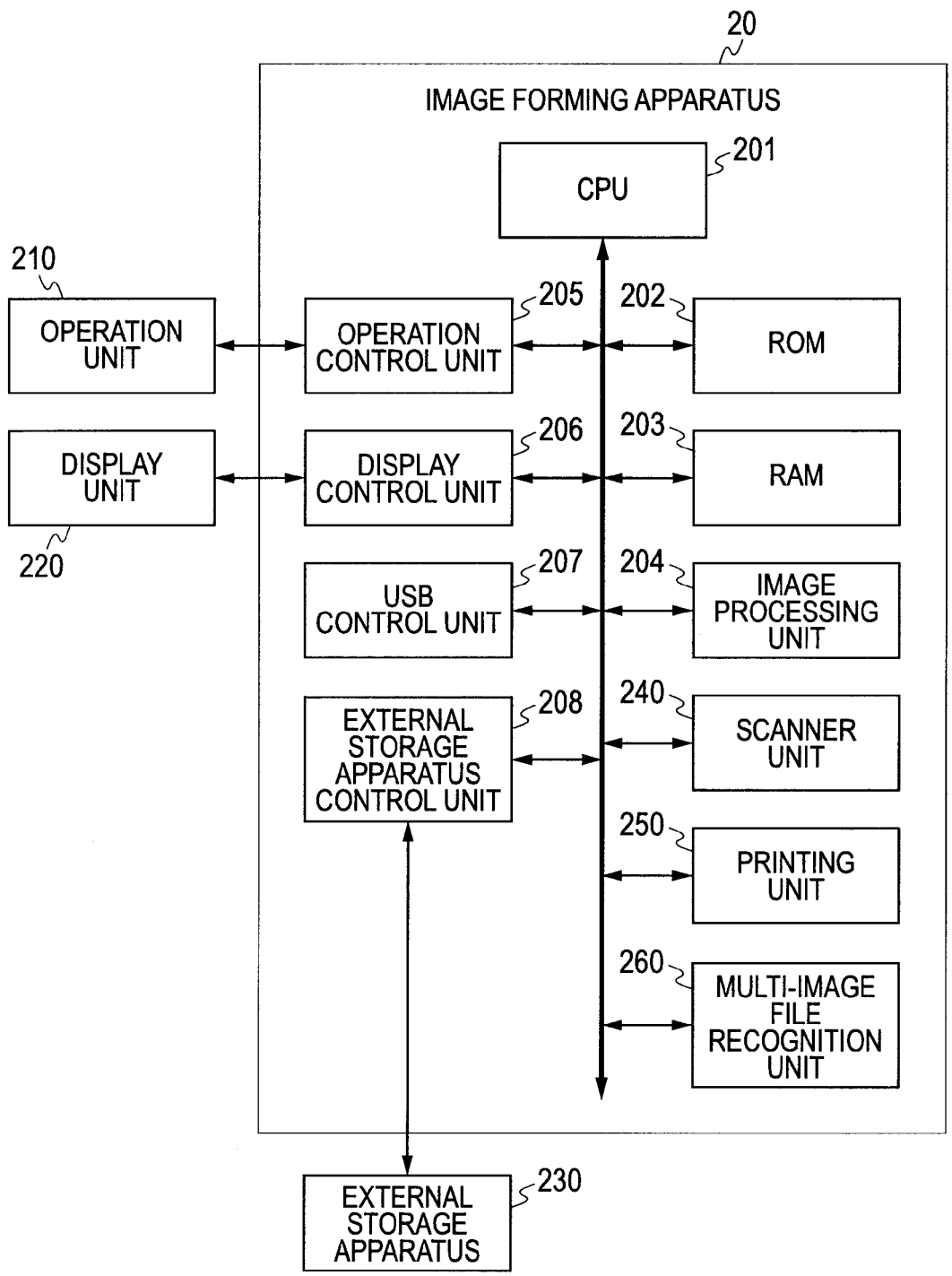
FIG. 2 is a block diagram illustrating a constitution of an image forming apparatus 20 according to the embodiment of the present invention.

FIG. 2 is a block diagram illustrating a hardware constitution of the image forming apparatus 20 according to the first embodiment of the present invention. A CPU (central processing unit) 201 totally controls the image forming apparatus 20 by reading various control programs stored in an ROM (read only memory) 202 to an RAM (random access memory) 203 and performing the read programs. The ROM 202 stores therein the various control programs read by the CPU 201, and the RAM 203 functions as a working memory for the CPU 201.

An image processing unit 204 performs various image processes such as an image rotation process, a color correction process and the like, according to instructions from the CPU 201. An operation control unit 205 accepts instructions from an operation unit 210, and transfers the accepted instructions to the CPU 201.

A display control unit 206 transmits display data to a display unit 220 according to an instruction from the CPU 201. The operation unit 210 has various hardware keys for accepting various instructions from the user. Further, the operation unit 210 has software keys for which a touch panel integrally constituted with the display unit 220 is utilized. Thus, the operation unit 210 transmits various instructions accepted from the hardware keys or the software keys to the operation control unit 205.

A USB control unit 207, which has a connection unit to which the USB memory is connected, controls reading of data stored in the USB memory connected to the connection unit or writing of data to the USB memory. An external storage apparatus control unit 208 controls reading of data stored in an external storage apparatus 230 or writing of data to the external storage apparatus 230. The external storage apparatus 230, which is constituted by an HDD (hard disk drive) or the like, stores therein image data.

A scanner unit 240 reads an image of an original set on the original board, and generates image data based on the read original. A printing unit 250 prints the image data generated by the scanner unit 240 or the image data stored in the external storage apparatus 230. A multi-image file recognition unit 260 interprets the file header of the multi-image file that the plural images are included in one file, and the CPU 201 recognizes the plural images included in the multi-image file based on a result of the interpretation by the multi-image file recognition unit 260. That is, if the plural images included in the multi-image file are recognized by the multi-image file recognition unit 260, the recognized plural images can be processed by the CPU 201.

FIG. 3 is a block diagram illustrating a hardware constitution of the image forming apparatus 30 according to the first embodiment of the present invention. In the drawing, a CPU 301 totally controls the image forming apparatus 30 by reading various control programs stored in an ROM 302 to an RAM 303 and performing the read programs. The ROM 302 stores therein the various control programs read by the CPU 301, and the RAM 303 functions as a working memory for the CPU 301.

An image processing unit 304 performs various image processes such as an image rotation process, a color correction process and the like, according to instructions from the CPU 301. An operation control unit 305 accepts instructions from an operation unit 310, and transfers the accepted instructions to the CPU 301.

A display control unit 306 transmits display data to a display unit 320 according to an instruction from the CPU 301. The operation unit 310 has various hardware keys for accepting various instructions from the user. Further, the operation unit 310 has software keys for which a touch panel integrally constituted with the display unit 320 is utilized. Thus, the operation unit 310 transmits various instructions accepted from the hardware keys or the software keys to the operation control unit 305.

A USB control unit 307, which has a connection unit to which the USB memory is connected, controls reading of data stored in the USB memory connected to the connection unit or writing of data to the USB memory. An external storage apparatus control unit 308 controls reading of data stored in an external storage apparatus 330 or writing of data to the external storage apparatus 330. The external storage apparatus 330, which is constituted by an HDD (hard disk drive) or the like, stores therein image data.

A scanner unit 340 reads an image of an original set on the original board, and generates image data based on the read original. A printing unit 350 prints the image data generated by the scanner unit 340 or the image data stored in the external storage apparatus 330. Incidentally, unlike the multi-image file recognition unit 260 in the image forming apparatus 20, even if an image file recognition unit 380 interprets the file header of the multi-image file that the plural images are included in one file, the image file recognition unit 380 cannot recognize all of the plural images included in the multi-image file. That is, it is possible to recognize only the leading image which is positioned at the address of which the address value is large next to that of the address at which the file header is positioned at the time when the relevant image is stored in the memory.

In case of causing the image forming apparatus 30 to recognize the multi-image file, the user can output only the leading image but cannot output the images other than the leading image.

FIG. 4 is a block diagram illustrating a hardware constitution of the print instruction apparatus 10 according to the first embodiment of the present invention. Here, it should be noted that the print instruction apparatus 10 is, e.g., a digital camera or a portable phone. A CPU 101 totally controls the print instruction apparatus 10 reading various control programs stored in an ROM 102 to an RAM 103 and performing the read programs. The ROM 102 stores therein the various control programs read by the CPU 101, and the RAM 103 functions as a working memory for the CPU 101.

An operation control unit 105 accepts instructions from an operation unit 120, and transfers the accepted instructions to the CPU 101. A display control unit 106 transmits display data to a display unit 130 according to an instruction from the CPU 101.

The operation unit 120 has various hardware keys for accepting various instructions from the user. Further, the operation unit 120 has software keys for which a touch panel integrally constituted with the display unit 130 is utilized. Thus, the operation unit 120 transmits various instructions accepted from the hardware keys or the software keys to the operation control unit 105. An external storage apparatus control unit 104 controls reading of data stored in an external storage apparatus 110 or writing of data to the external storage apparatus 110. The external storage apparatus 110, which is constituted by an HDD (hard disk drive) or the like, stores therein image data.

Further, the print instruction apparatus 10 has a not-illustrated shooting unit and a not-illustrated image processing unit.

FIG. 5 is a diagram for describing a configuration of the multi-image file which includes the leading image and plural images other than the leading image, according to the first embodiment of the present invention. Namely, it should be noted that the multi-image file is the file which can include one of plural images.

The multi-image file includes a file header 501, an image 1 (502), an index area 503, an image 2 (504), . . . , and an image N (505). Here, the file header 501 defines a file creation date and hour (i.e., a shooting date and hour of the digital camera) and a file name, and also defines a reading position of the image 1 (502) at the time when the multi-image file is stored in the memory. Such definitions are described by using a tag which is the same as that to be used for a general image file such as a TIFF (Tag Image File Format) file. Besides, a unique tag which is not used for the general image file such as the TIFF file is used to the file header 501. Thus, information (a name of each image, a reading position of each image, and the like) concerning the index area 503, the image 2 (504), . . . , and the image N (505) is defined by using suchlike tag.

Since the image file recognition unit 380 of the image forming apparatus 30 can interpret only the information described by the tag to be used for the TIFF file, the image file recognition unit 380 can recognize only the image 1 being the leading image. That is, the image file recognition unit 380 skips the contents described by the tag other than the tag to be used for the TIFF file. As a result, the image forming apparatus 30 which has the image file recognition unit 380 can recognize the image 1 (502), but cannot recognize the index area 503 and the images other than the image 1 (502).

Here, it should be noted that the image 1 (502) is equivalent to image data.

The index area 503 is the area in which index information concerning the image 2 (504) to the image N (505) is stored. For example, index information 2 concerning the image 2 (504) includes address information (506) indicating the reading position of the image 2 and a file header (507) indicating information of creation date and hour and the like for the image. In addition, as well as the index information 2 concerning the image 2, index information 3 concerning the image 3 to index information N concerning the image N are respectively stored in the index area 503. Here, the format of the file header (507) included in the index information depends on the format of the corresponding image. For example, if a certain image is stored in a BMP (Microsoft Windows Bitmap Image) format, header information corresponding to the certain image is stored also in the BMP format. Here, it should be noted that the image 2 (504) to the image N (505) are equivalent to image data.

The above-described multi-image file recognition unit 260 of the image forming apparatus 20 can interpret the unique tag which is not used for the general image file such as the TIFF file but is used for the multi-image file. Consequently, in a case where the storage medium on which the multi-image file has been stored is connected to the image forming apparatus 20, the multi-image file recognition unit 260 can recognize not only the existence of the image 502 but also the existence of the index area 503 by analyzing the file header 501 of the multi-image file. For this reason, the image forming apparatus 20 can recognize the image 2 (504) to the image N (505) based on a result of the analysis to the index area 503. Then, the image forming apparatus 20 can display the recognized images 1 to the image N on the display unit 220. Further, in response to image selection and output instructions by the user, the image forming apparatus 20 can print or transmit the selected image.

However, in a case where the storage medium on which the multi-image file has been stored is connected to the image forming apparatus 30, the image file recognition unit 380 cannot interpret the unique tag which is not used for the general image file such as the TIFF file. For this reason, the CPU 301 of the image forming apparatus 30 can recognize the image 1 (502) based on the information of the file header 501, but cannot recognize the image 2 (504) to the image N (505). This is because, since the image file recognition unit 380 skips the information included in the file header 501 and indicating the reading position of the index area 503, the image file recognition unit 380 cannot recognize the existence of the index area 503.

For this reason, even if the user wishes to output the image 2 (504) to the image N (505) included in the multi-image file by using the image forming apparatus 30, he/she cannot do so. That is, in the image forming apparatus 30 of the type not having a device corresponding to the multi-image file recognition unit 260 of correctly interpreting the multi-image file, it is impossible to recognize and output the image other than the leading image included in the multi-image file.

Consequently, the present embodiment aims to enable even the image forming apparatus 30, which does not have a function of correctly recognizing the image other than the leading image included in the image file, to easily output the image other than the leading image.

Figure 6:
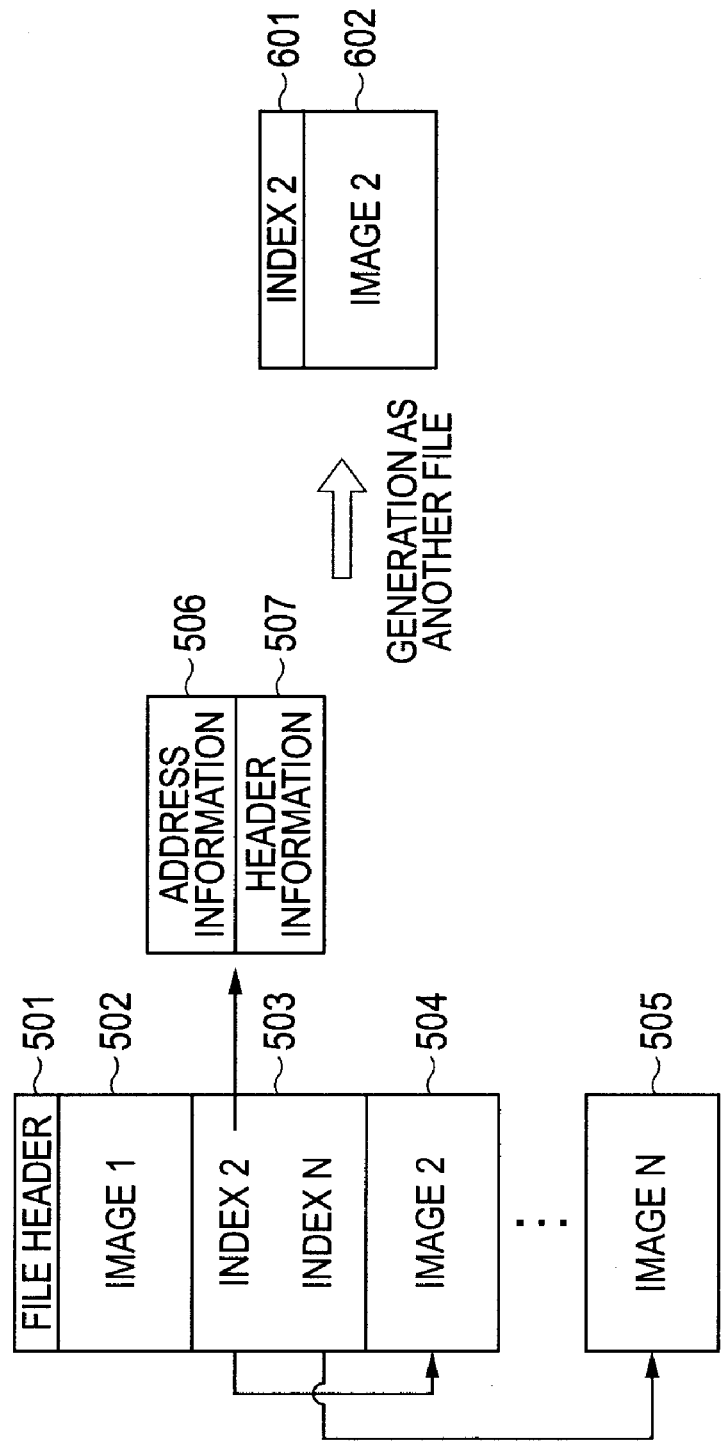
FIG. 6 is a diagram for describing a multi-image file according to the embodiment of the present invention.

More specifically, in the case where the image forming apparatus 20 which includes the multi-image file recognition unit 260 according to the present embodiment prints the image included in the multi-image file, the image forming apparatus 20 associates the image included in the multi-image file and the header information corresponding to the relevant image with each other and generates the associated image and information as another image file which includes an index 2 (601) and an image 2 (602) (FIG. 6). At this time, the image forming apparatus 20 positions the image in the generated image file at the address which is large next to that of the file header at the time when the generated image file is stored in the memory, so that the image forming apparatus 30 can recognize the image included in the relevant image file.

Then, the image forming apparatus 20 causes the storage medium such as the memory in the print instruction apparatus 10, the USB memory or the like to store the generated another image file. As illustrated in FIG. 6, the image file thus stored has, as the file header, the header information which is extracted from the index area and described by using the same tag as that to be used for the general image file. Consequently, also the image forming apparatus 30 can print the relevant image. For this reason, the user can cause the image forming apparatus 30, which does not have the function to correctly recognize the image other then the leading image included in the image file, to print the relevant image by connecting the above-described storage medium to the image forming apparatus 30.

Figure 7:
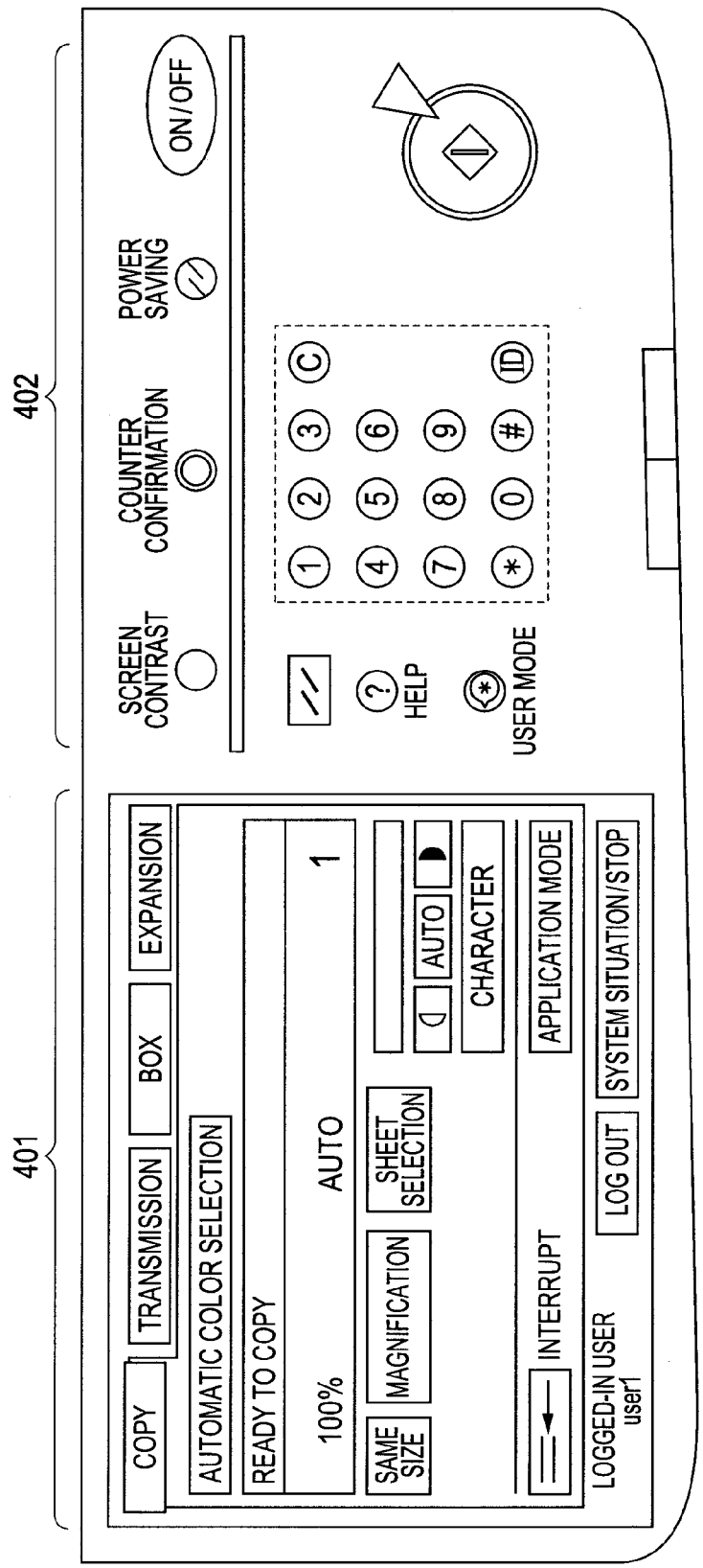
FIG. 7 is a diagram for describing an operation unit according to the embodiment of the present invention.

FIG. 7 is a diagram for describing an example of the operation unit 210 to be used for the image forming apparatus 20. Here, the operation unit 210 includes a touch panel section 401 and a key input section 402. The touch panel section 401, which is composed of a liquid crystal display section and a touch panel section, displays an operation screen, and accepts instructions from a user through user's operations on the operation screen. The key input section 402, which has various hardware keys, accepts instructions from the user through user's operations of the hardware keys. That is, the image forming apparatus 20 accepts the instructions from the user through the touch panel section 401 and/or the key input section 402, and operates according to the accepted instructions.

Figure 8:
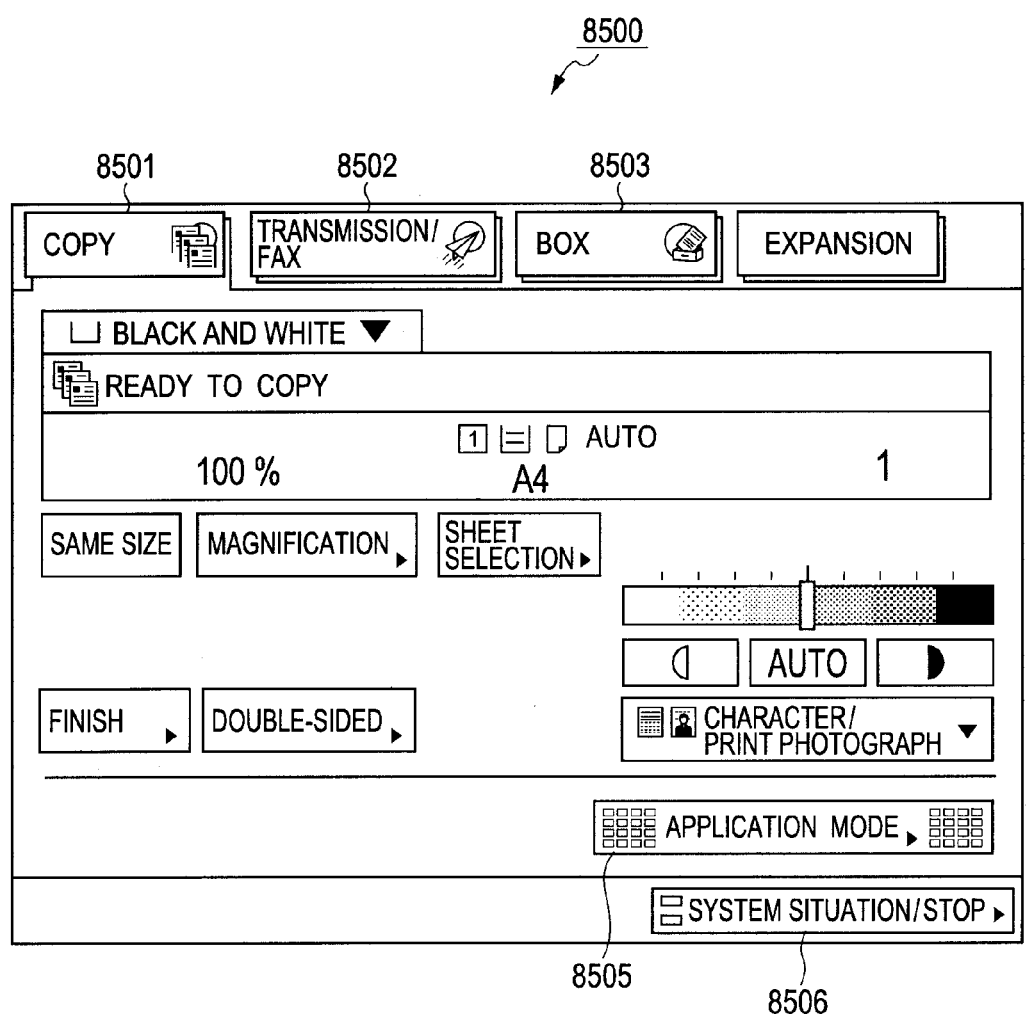
FIG. 8 is a diagram for describing an operation screen according to the embodiment of the present invention.

FIG. 8 is a diagram illustrating an operation screen 8500 to be displayed on the operation unit 210 illustrated in FIG. 7. That is, the user performs print settings by using the operation screen 8500 illustrated in FIG. 8. In the drawing, a copy tab 8501 acts as the key for displaying the operation screen to be used to perform setting of a copy function, and a transmission tab 8502 acts as the key for displaying the operation screen to be used to perform settings of an E-mail and a facsimile function. A box key 8503 is the key for displaying the operation screen to be used to perform setting of a box function, and an expansion key 8504 is the key for displaying the operation screen to be used to perform setting of an expansion function. An application mode key 8505 is the key for displaying the operation screen to be used to perform setting of sheets to be set to a sheet feeding unit, and setting of page numbers to be added to the sheets to which printing is performed. A system situation key 8506 is the key for displaying the screen which indicates situations of the apparatus.

FIG. 9 is a diagram illustrating an operation screen to be displayed on the operation unit 210. If the USB memory is connected to the image forming apparatus 20, the information of the file stored in the USB memory is obtained through the USB control unit 207. Alternatively, if it is requested by depression of the application mode key 8505 to obtain the information of the file stored in the USB memory through the displayed operation screen, the stored information of the file may be obtained. Then, the CPU 201 obtains the information of the file stored in the USB memory through the USB control unit 207, and causes the operation unit 210 to display the screen illustrated in FIG. 9 on the basis of the obtained information of the file.

On the operation screen illustrated in FIG. 9, a multi-image file that plural images are stored as one file and a file (hereinafter, called an ordinary file) other than the multi-image file can be displayed. More specifically, on the operation screen illustrated in FIG. 9, an extension "pic" is displayed as an extension of the multi-image file, and an extension "bmp" according to a kind of image included in the ordinary file is displayed as an extension of the ordinary file.

In any case, the user selects the file in which the image that the user wishes to print is included, from among the plural files displayed on the operation screen illustrated in FIG. 9. If the user selects the ordinary file, he/she can immediately instruct to print the image included in the selected ordinary file by depressing the print button. On the other hand, if the user selects the multi-image file, the CPU 201 causes the display unit 210 to display an operation screen illustrated in FIG. 10 which displays the plural images included in the selected multi-image file.

FIG. 10 is a diagram illustrating the operation screen to be displayed on the operation unit 210. On the operation screen illustrated in FIG. 10, a list of the plural images included in the multi-image file is displayed. More specifically, FIG. 10 indicates the screen which is displayed by the CPU 201 if the multi-image file "20080101_2.pic" displayed on the operation screen illustrated in FIG. 9 is selected. That is, images "image01" to "image05" are the plural images included in the multi-image file "20080101_2.pic".

The user selects the image that the user wishes to print, from among the plural images displayed on the operation screen illustrated in FIG. 10. Then, if the user depresses the print button in the state that the relevant image is being selected, it is possible to instruct to print the image being selected. Further, if the user depresses the "DISPLAY SELECTED FILE" button, it is possible to instruct from the operation screen to display the image being selected. Furthermore, if the user depresses the "PRINT SELECTED FILE" button, it is possible to instruct from the operation screen to print the image being selected. Besides, if the user depresses a not-illustrated "TRANSMIT SELECTED FILE" button, it is possible to instruct from the operation screen to transmit the image being selected. As just described, the user can instruct various kinds of output operations through the operation screen illustrated in FIG. 10.

Hereinafter, control to be performed by the image forming apparatus 20 will be described concretely with reference to a flow chart.

Figure 11:
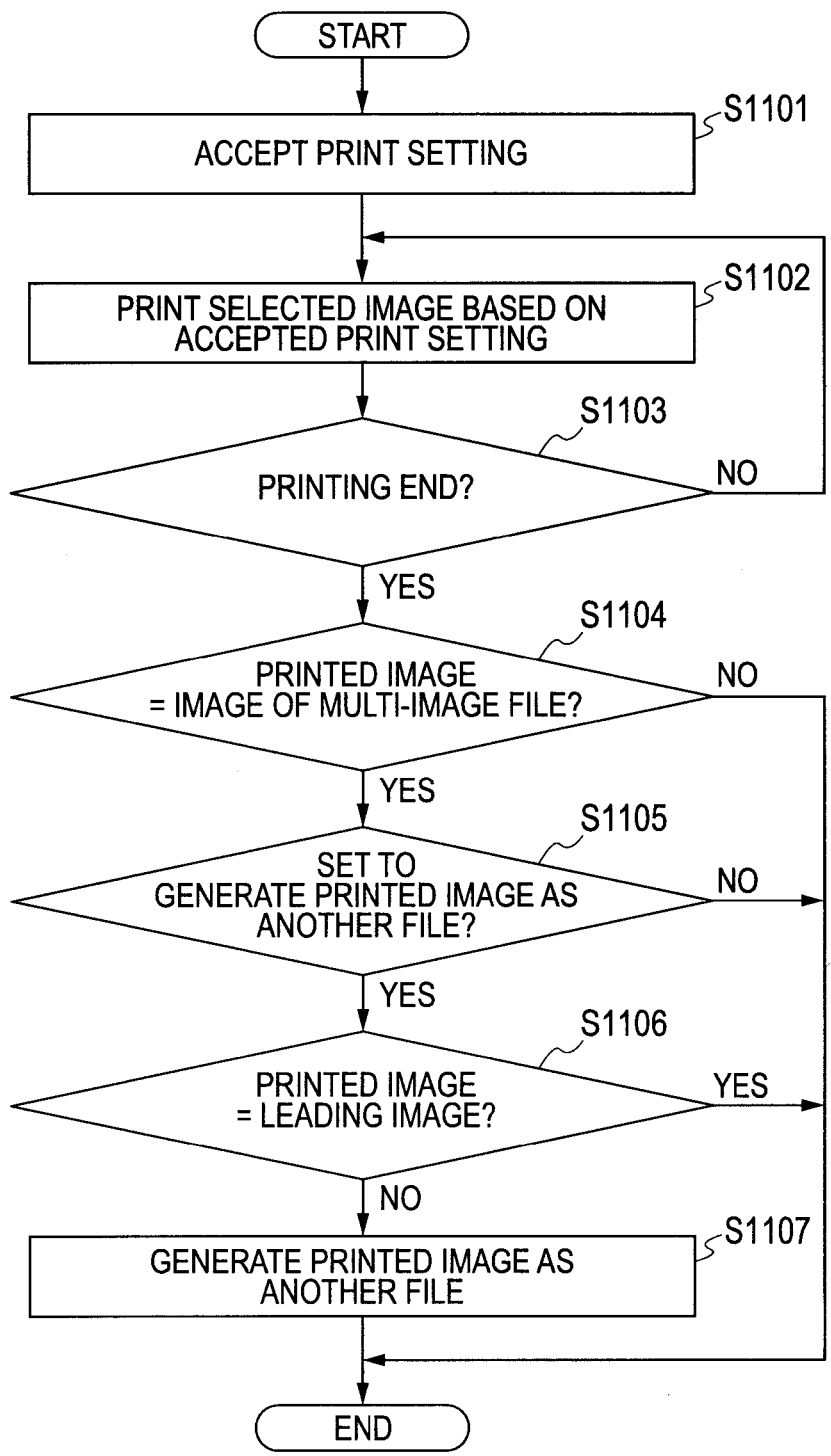
FIG. 11 is a flow chart indicating a flow of a process according to the embodiment of the present invention.

FIG. 11 is a flow chart indicating the control process to be performed by the image forming apparatus 20 according to the present embodiment. Here, it should be noted that the respective steps of the flow chart illustrated in FIG. 11 are achieved in a case where the CPU 201 of the image forming apparatus 20 performs the programs stored in the ROM 202. Further, it should be noted that the flow chart illustrated in FIG. 11 indicates the control that the CPU 201 performs in a case where the CPU 201 causes to print the image stored in the storage medium such as the USB memory or the like through the USB control unit 207.

In S1101, the CPU 201 accepts the print setting from the user through the operation unit 210. More specifically, the CPU 201 first accepts the selection of the image to be printed from the user through the operation screen illustrated in FIG. 9, and then accepts the print setting (including the setting of print sheets, the setting of print magnification, the setting of print layout, etc.) in regard to the selected image.

In S1102, the CPU 201 causes to print the image selected in S1101, on the basis of the accepted print setting.

In S1103, the CPU 201 judges whether or not the printing ends. If judged that the printing does not end, the CPU 201 returns the process to S1102 to perform the printing. On the other hand, if judged that the printing ends, the CPU 201 advances the process to S1104.

In S1104, the CPU 201 judges whether or not the printed image is the image of the multi-image file. If judged that the printed image is not the image of the multi-image file (that is, if judged that the printed image is the image of the ordinary file), the CPU 201 ends the process.

On the other hand, if judged that the printed image is the image of the multi-image file, the CPU 201 advances the process to S1105.

In S1105, the CPU 201 judges whether or not it has been set by the user to generate the printed image as another file. If judged that it is not set by the user to generate the printed image as another file, the CPU 201 ends the process. On the other hand, if judged that it has been set by the user to generate the printed image as another file, the CPU 201 advances the process to S1106. Incidentally, the user may previously determine whether or not to generate the printed image as another file, as the setting of the image forming apparatus 20. Further, the user may set whether or not to generate the printed image as another file through the operation screen every time the user prints the image in the multi-image file.

In S1106, the CPU 201 judges whether or not the printed image is the leading image in the multi-image file. If judged that the printed image is the leading image in the multi-image file, the CPU ends the process. On the other hand, if judged that the printed image is not the leading image in the multi-image file, the CPU 201 advances the process to S1107.

In S1107, the CPU 201 performs a process to generate the printed image as another file. More specifically, the CPU 201 associates, in the multi-image file including the printed image, the printed image with the index information corresponding to the relevant printed image, and generates as another file the printed image and the index information associated with each other. Then, the CPU 201 writes the generated file to the USB memory through the USB control unit 207. Here, the format of the image file generated in S1107 may be a general-purpose format such as the JPEG format or the like.

As described above, in the case where the printed image is the image included in the multi-image file, if the relevant image is not the leading image, the relevant image is generated as another file and stored in the USB memory. That is, by generating the relevant image as another file, it is possible even by the image forming apparatus which does not have the multi-image file recognition unit and thus cannot recognize the image included in the multi-image file to print the relevant image. Further, the user of the image forming apparatus capable of recognizing the multi-image file can generate the relevant image as another file by performing a simple operation of instructing to print any one of the images included in the multi-image file.

Incidentally, in the present embodiment, in the case where the printed image is the image included in the multi-image file, if the relevant image is not the leading image, the relevant image is generated as another file and stored in the USB memory. However, in addition to the printing of the image, transmission or display of the image is conceivable. Under the circumstance, in a case where the transmitted image or the displayed image is the image included in the multi-image file, if the relevant image is not the leading image, then the relevant image may be generated as another file and stored in the USB memory.

Second Embodiment

In the above-described first embodiment, in the case where the printed image is the image included in the multi-image file, if the relevant image is not the leading image, the relevant image is generated as another file.

In the second embodiment, instead of the process of generating the image as another file, a process of replacing the printed image with the leading image is performed.

Incidentally, in the second embodiment, the configuration of the image forming system and the constitutions of the respective apparatuses included in the image forming system are the same as those already described with reference to FIGS. 1 to 10. For this reason, the detailed descriptions of the above configuration and constitutions will be omitted here.

Hereinafter, control to be performed by the image forming apparatus 20 will be described concretely with reference to a flow chart.

Figure 12:
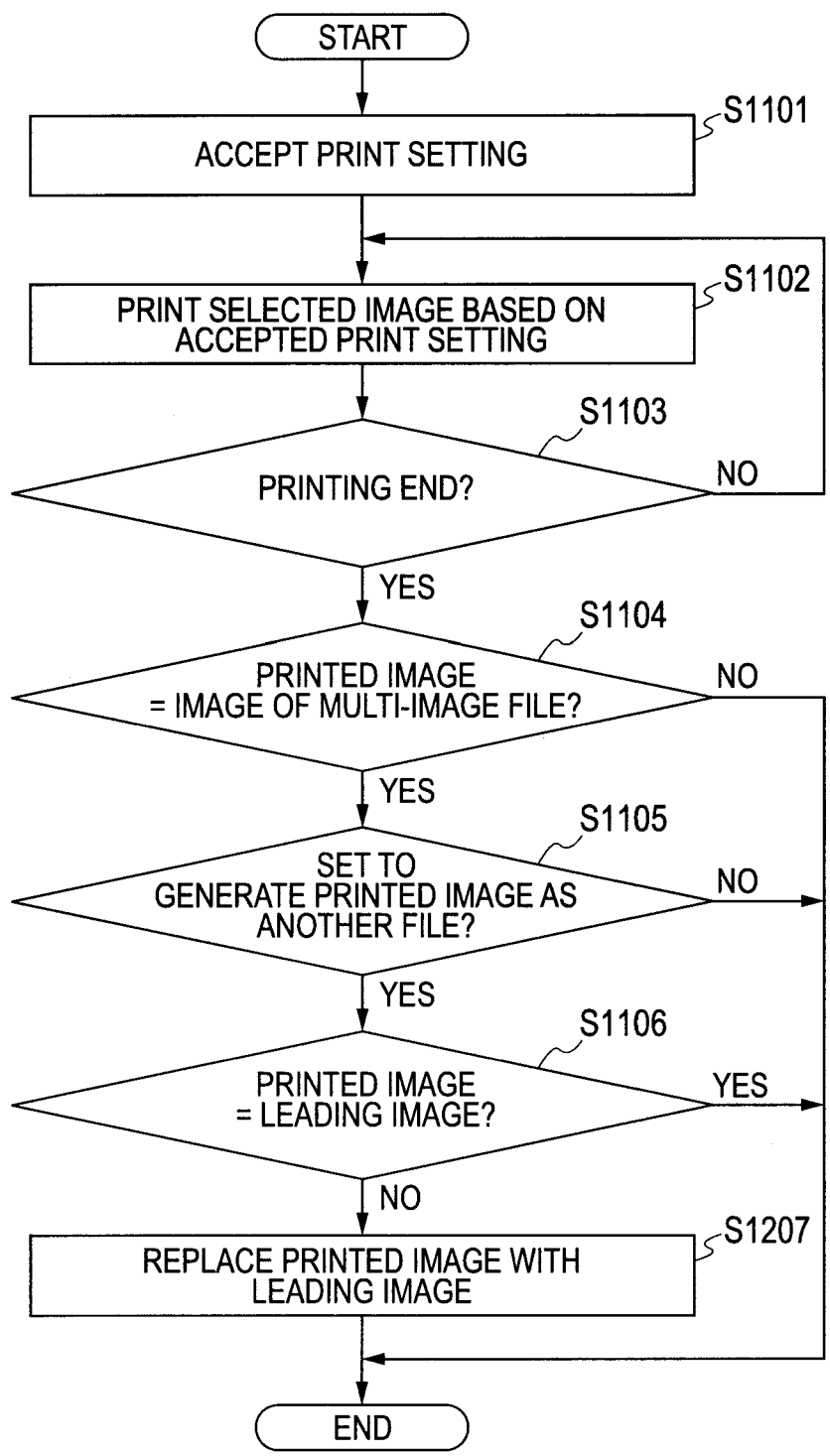
FIG. 12 is a flow chart indicating a flow of a process according to the embodiment of the present invention.

FIG. 12 is a flow chart indicating the control process to be performed by the image forming apparatus 20 according to the present embodiment. Here, it should be noted that the respective steps of the flow chart illustrated in FIG. 12 are achieved in a case where the CPU 201 of the image forming apparatus 20 performs the programs stored in the ROM 202. Further, it should be noted that the flow chart illustrated in FIG. 12 indicates the control that the CPU 201 performs in a case where the CPU 201 causes to print the image stored in the storage medium such as the USB memory or the like through the USB control unit 207.

Incidentally, in the flow chart of FIG. 12, since the same processes as those in the flow chart of FIG. 11 are denoted by the same reference numerals as those in the flow chart of FIG. 11 respectively, the detailed description of these processes will be omitted here.

In the present embodiment, if the CPU 201 judges in S1106 that the printed image is not the leading image in the multi-image file, the CPU 201 advances the process to S1207 to perform a replacement process of replacing the printed image with the leading image.

Figure 13:
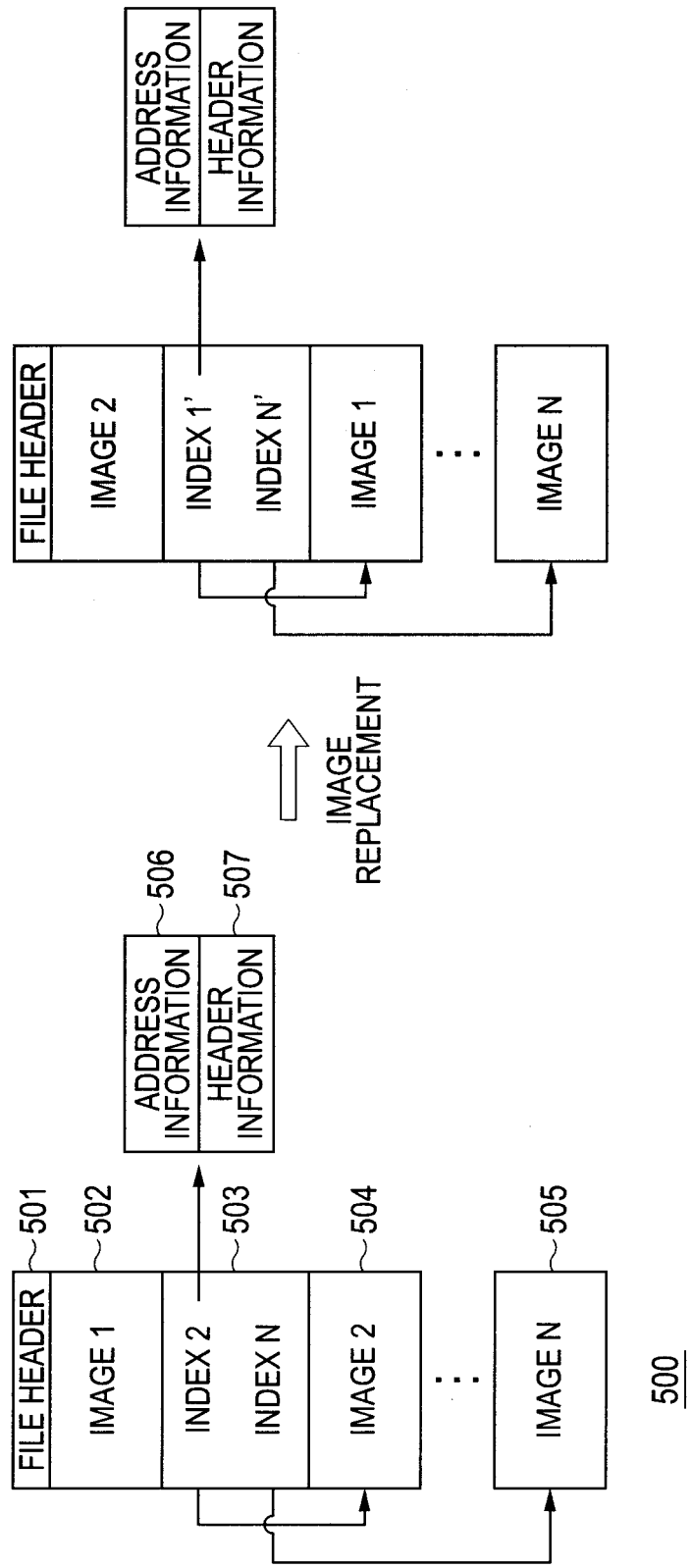
FIG. 13 is a diagram for describing a multi-image file according to the embodiment of the present invention.

FIG. 13 is a diagram for describing the replacement process. That is, FIG. 13 indicates a multi-image file 500 precedent to the replacement process of the image. In any case, since the configuration of the multi-image file precedent to the replacement process of the image is the same as that already described with reference to FIG. 5, the detailed description will be omitted here.

Hereinafter, a case of printing the image 2 among the plural images included in the multi-image file like this will be described. That is, in S1101, the CPU 201 accepts, from the user through the operation unit 210, the selection of the image 2 and the print setting for the printing of the image 2. Then, in S1102, the CPU 201 causes to print the selected image 2 on the basis of the accepted print setting.

Subsequently, in S1103, if the CPU 201 judges that the printing ends, the CPU 201 advances the process to S1104 to further judge whether or not the printed image is the image of the multi-image file. Here, since the image 2 is the image of the multi-image file 500, the CPU 201 advances the process to S1105. In S1105, the CPU 201 further judges whether or not it has been set by the user to replace the printed image with the leading image. Here, it is assumed that it has been set by the user to replace the printed image with the leading image. Incidentally, the setting for replacing the printed image with the leading image may previously be provided as the setting of the image forming apparatus 20. On the other hand, the setting for replacing the printed image with the leading image may be performed by the user.

In this case, the CPU 201 judges in S1106 whether or not the printed image is the leading image. Here, since the leading image of the multi-image file 500 is the image 1, the CPU 201 judges that the printed image 2 is not the leading image.

Then, in S1207, the CPU 201 causes the multi-image file recognition unit 260 to extract the header information of the image 1 included in the file header, associate the extracted header information with the image 1, and then store them in the RAM 203. Further, the CPU 201 causes the multi-image file recognition unit 260 to extract the printed image 2 and the index information corresponding to the image 2 from the index area 503, and then store them in the RAM 203. Furthermore, the CPU 201 causes the multi-image file recognition unit 260 to write the image 2 stored in the RAM 203 to the area subsequent to the file header (i.e., the area in which the image 1 has been stored), and write the index information corresponding to the image 2 to the file header. Furthermore, the CPU 201 causes the multi-image file recognition unit 260 to write the image 1 stored in the RAM 203 to the area subsequent to the index area 503. Furthermore, the CPU 201 writes the header information of the image 1 in the index area 503. At that time, the CPU 201 causes the multi-image file recognition unit 260 to write the memory address of the image 1 to the index area 503 as address information (i.e., an index 1').

As described above, in the case where the printed image is the image included in the multi-image file, if the relevant image is not the leading image, the relevant image is replaced with the leading image, and then the obtained images are stored in the USB memory. That is, by replacing the printed image with the leading image as described above, it is possible, even by the image forming apparatus which does not have the multi-image file recognition unit and thus can recognize only the leading image among the plural images included in the multi-image file, to print the specific image that the user wishes to print. Further, it is possible, even by the image forming apparatus which can recognize the plural images included in the multi-image file in which the printed image has been replaced with the leading image, to print the arbitrary image among the plural images in the state before the printed image is replaced with the leading image.

Incidentally, in the present embodiment, in the case where the printed image is the image included in the multi-image file, if the relevant image is not the leading image, the relevant image is replaced with the leading image, and the obtained images are stored in the USB memory. However, in addition to the printing of the image, transmission or display of the image is conceivable. Under the circumstance, in a case where the transmitted image or the displayed image is the image included in the multi-image file, if the relevant image is not the leading image, then the relevant image may be replaced with the leading image and thus obtained images may be stored in the USB memory.

Further, in the present embodiment, in the case where the printed image is the image included in the multi-image file, if the relevant image is not the leading image, the relevant image is replaced with the leading image. However, such control as described below may be performed. That is, there is a case where thumbnail images are provided in the multi-image file. Under the circumstance, if the image in the multi-image file is printed, the printed image may be replaced with the thumbnail image. By doing so, the image which is displayed by the image forming apparatus of recognizing and displaying the thumbnail images can be changed to the thumbnail image in the state before such a change to the printed image.

Third Embodiment

In the above-described first and second embodiments, the desired image among the images of the multi-image file in the image forming apparatus 20 is stored in the storage medium such as the USB memory or the like, the stored image is then read and printed by the image forming apparatus 30.

In the third embodiment, an example of causing the image forming apparatus 30, which does not have the multi-image file recognition unit 260, to print the image of the multi-image file stored in an apparatus capable of directly communicating with the image forming apparatus 30 by means of a communication unit, through a communication unit in response to an instruction by a user will be described.

Concretely, in the present embodiment, the image of the multi-image file stored in the print instruction apparatus 10 illustrated in FIG. 1 is transferred together with the print instruction to the image forming apparatus 30 through a USB cable 50, thereby causing the image forming apparatus 30 to print the relevant image.

Here, it should be noted that the constitution of the print instruction apparatus 10 is the same as that already described with reference to FIG. 4.

Hereinafter, a control process to be performed in the print instruction apparatus 10 will be described with reference to a flow chart.

Figure 14:
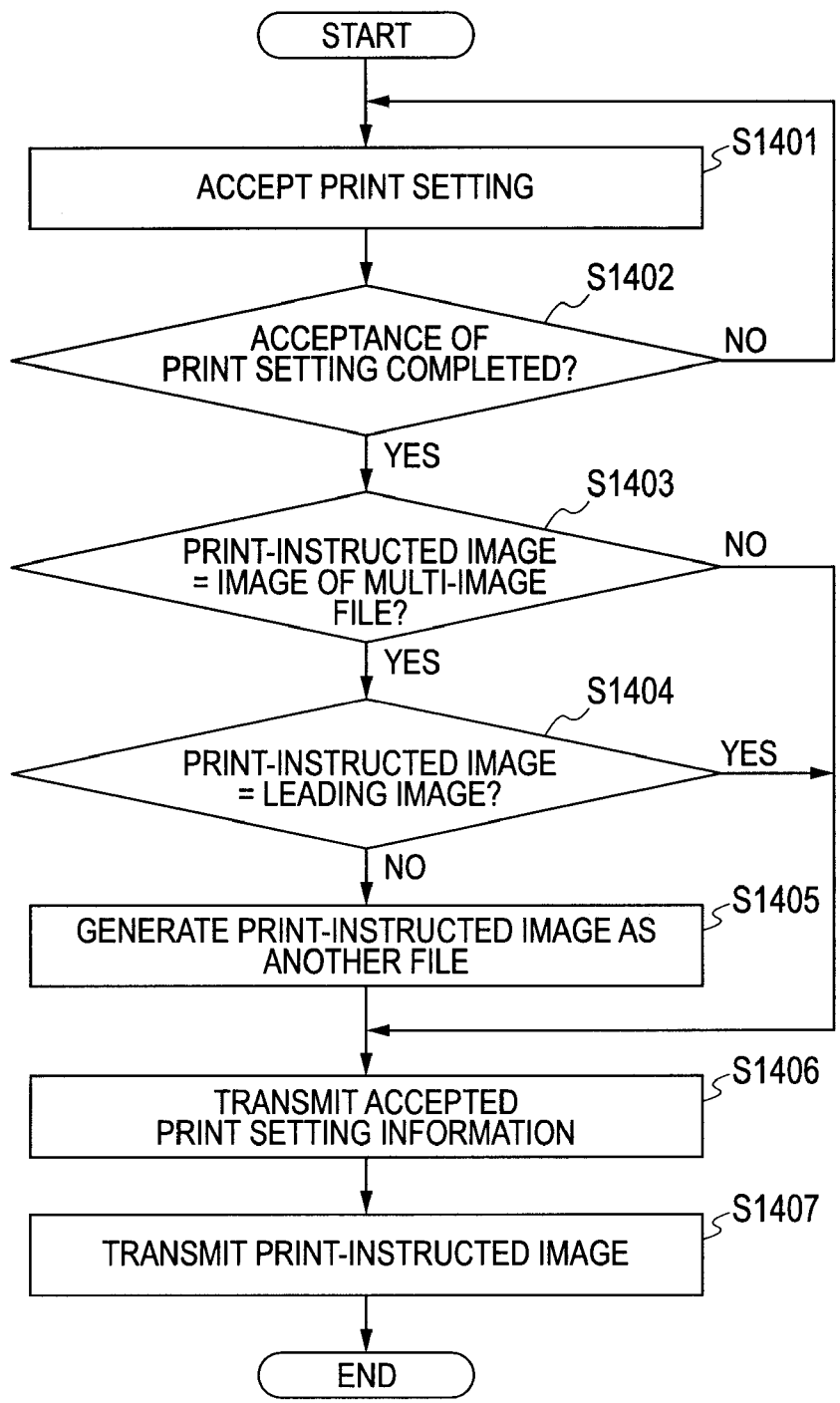
FIG. 14 is a flow chart indicating a flow of a process according to the embodiment of the present invention.

FIG. 14 is a flow chart indicating the control process to be performed by the print instruction apparatus 10 according to the present embodiment. Here, it should be noted that the respective steps of the flow chart illustrated in FIG. 14 are achieved in a case where the CPU 101 of the print instruction apparatus 10 performs the programs stored in the ROM 102. Further, it should be noted that the flow chart illustrated in FIG. 14 indicates the control that the CPU 101 performs when accepting selection of the image to be printed and the print setting from the user through the operation unit 120 and transmitting the selected image and the print setting to the image forming apparatus 30 through a USB control unit 107 (FIG. 4).

Initially, in S1401, the CPU 101 displays such a screen as illustrated in, for example, FIG. 9 on the operation unit 120, and accepts the selection of the image to be printed and the print setting from the user through the operation unit 120. Then, the CPU 101 stores identification information indicating the selected image and print setting information indicating the accepted print setting, into the RAM 103.

Subsequently, in S1402, the CPU 101 judges whether or not the acceptance of the print setting is completed. For example, if the print button illustrated in FIG. 9 is depressed by the user, the CPU 101 judges that the acceptance of the print setting is completed and the print instruction for the selected image is accepted, and advances the process to S1403. On the other hand, if judged that the acceptance of the print setting is not completed, the CPU 101 repeats the process in S1401.

In S1403, the CPU 101 judges whether or not the image to which the print instruction has been accepted is the image included in the multi-image file. Then, if judged that the image to which the print instruction has been accepted is not the image included in the multi-image file (that is, if judged that the image to which the print instruction has been accepted is the image included in the ordinary file), the CPU 101 advances the process to S1406. On the other hand, if judged that the image to which the print instruction has been accepted is the image included in the multi-image file, the CPU 101 advances the process to S1404.

In S1404, the CPU 101 judges whether or not the image to which the print instruction has been accepted is the leading image included in the multi-image file. Then, if judged that the image to which the print instruction has been accepted is the leading image included in the multi-image file, the CPU 101 advances the process to S1406. On the other hand, if judged that the image to which the print instruction has been accepted is not the leading image included in the multi-image file, the CPU 101 advances the process to S1405 to perform a process of generating, as another file, the image to which the print instruction has been accepted (also called the print-instructed image). Here, since the process to be performed by the CPU 101 is the same as that already described in S1107 in the first embodiment, the description thereof will be omitted.

Then, in S1406, the CPU 101 transmits the print setting information indicating the print setting accepted in S1401 and stored in the RAM 103 to the image forming apparatus 30. Further, in S1407, the CPU 101 transmits the image to which the print instruction has been accepted in S1401 to the image forming apparatus 30.

The image forming apparatus 30, which receives the print setting information and the image from the print instruction apparatus 10, prints the received image based on the received print setting information. More specifically, the print process to be performed by the image forming apparatus 30 will be described with reference to a flow chart illustrated in FIG. 16. Here, it should be noted that the respective steps of the flow chart illustrated in FIG. 16 are achieved in a case where the CPU 301 of the image forming apparatus 30 performs the programs stored in the ROM 302.

Initially, in S1601, the CPU 301 receives the print setting information from the print instruction apparatus 10 through the USB cable acting as an example of the communication unit. Then, in S1602, the CPU 301 receives the image to which the print instruction has been accepted, from the print instruction apparatus 10 through the USB cable. After then, in S1603, the CPU 301 prints the received image on the basis of the received print setting information, and then ends the process.

By the control as described above, it is possible to cause the image forming apparatus 30, which does not have the multi-image file recognition unit 260, to print the image of the multi-image file stored in the apparatus capable of directly communicating with the image forming apparatus 30 in response to the instruction by the user.

Fourth Embodiment

In the above-described second embodiment, in the case where the printed image is the image included in the multi-image file, if the relevant image is not the leading image, then the relevant image is generated as another file.

In the fourth embodiment, instead of the process of generating the image as another file, a process of replacing the printed image with the leading image will be described with reference to a flow chart illustrated in FIG. 15.

In the present embodiment, if it is judged that the image to which the print instruction has been accepted is not the leading image, the CPU 101 performs in S1505 a process of replacing the printed image with the leading image.

In any case, since the process of replacing the printed image with the leading image is the same as the image replacing process already described in the second embodiment, the description thereof will be omitted.

As just described, in the case where the image to which the print instruction has been accepted is the image included in the multi-image file, if the relevant image is not the leading image, then the relevant image is replaced with the leading image, and the obtained images are transmitted to the image forming apparatus 30 in S1507.

Figure 15:
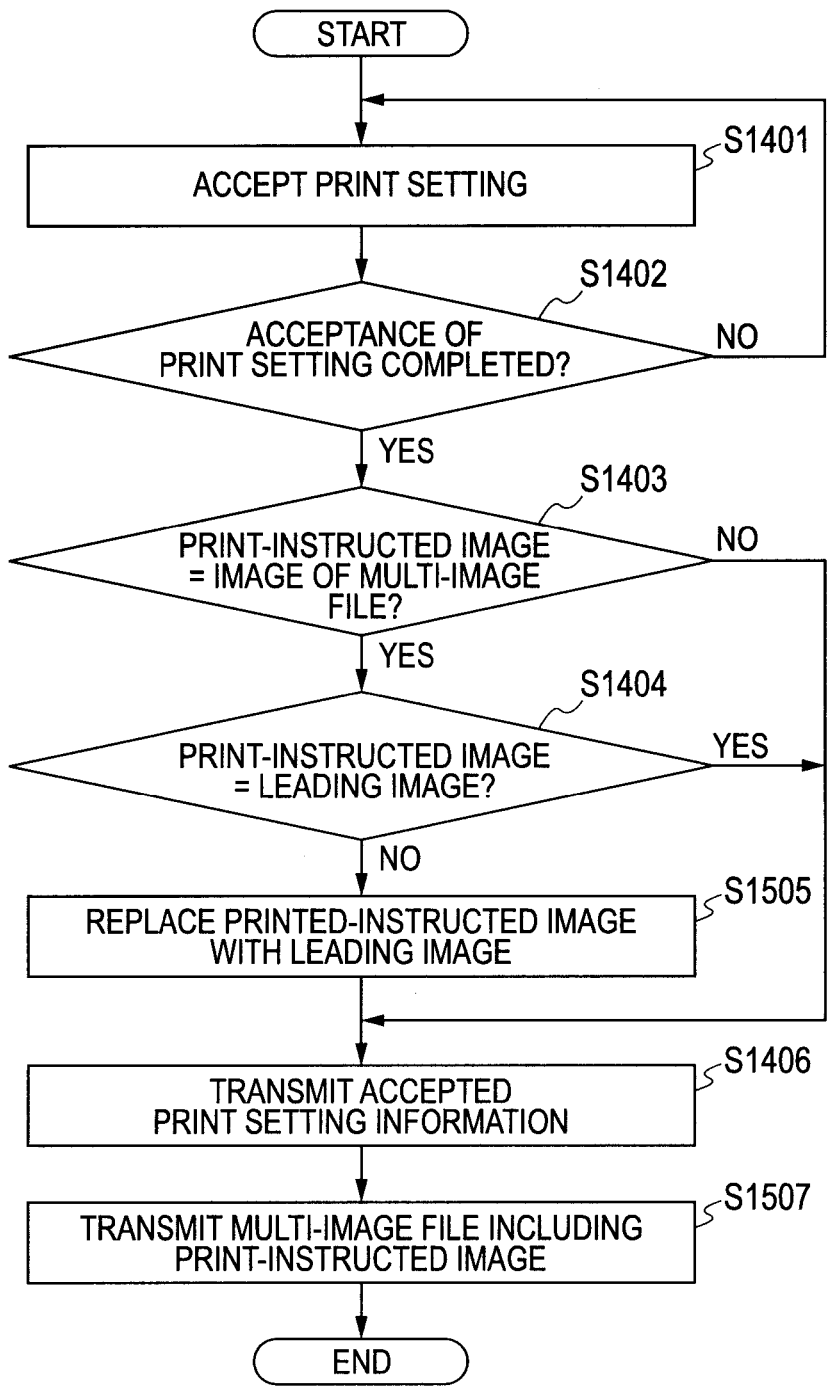
FIG. 15 is a flow chart indicating a flow of a process according to the embodiment of the present invention.

Incidentally, since the processes in the steps other than S1505 and S1507 in the flow chart illustrated in FIG. 15 are respectively the same as those in the corresponding steps in the flow chart illustrated in FIG. 14, the description thereof will be omitted here.

A process of printing the received image will be concretely described with reference to a flow chart illustrated in FIG. 17. Here, it should be noted that the respective steps of the flow chart illustrated in FIG. 17 are achieved in a case where the CPU 301 of the image forming apparatus 30 performs the programs stored in the ROM 302.

Initially, in S1701, the print setting information is received from the print instruction apparatus. Then, in S1702, the multi-image file including the image to which the print instruction has been accepted is received from the print instruction apparatus. Subsequently, in S1703, the relevant image included in the received multi-image file is printed, and the process ends.

Thus, it is possible, even by the image forming apparatus which does not have the multi-image file recognition unit and thus can recognize only the leading image among the plural images included in the multi-image file, to print the image that the user wishes to print.

Other Embodiments

In the above-described first embodiment, the process of generating the printed image as another file is performed. Further, in the above-described second embodiment, the process of replacing the printed image with the leading image of the multi-image file is performed.

However, the present invention is not limited to these embodiments. That is, respective approaches in the first and second embodiments may be properly combined and achieved. For example, in a case where print instructions for plural images are accepted and plural images other than the leading image are included in the plural images to which the print instructions have been accepted respectively, it is possible to control to replace only one of the images with the leading image and generate other images as other files.

Aspects of the present invention can also be realized by a computer of a system or an apparatus (or a device such as a CPU or an MPU) that reads out and executes a program recorded on a memory device to perform the functions of the above-described embodiments, and by a method, the steps of which are performed by a computer of a system or an apparatus by, for example, reading out and executing a program recorded on a memory device to perform the functions of the above-described embodiments. For this purpose, the program is provided to computer for example via a network or from a recording medium of various types serving as the memory device (e.g., a computer-readable medium).

While the present invention has been described with reference to the exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-155306, filed Jun. 30, 2009, which is hereby incorporated by reference herein in its entirety.

The invention claimed is:

1. A management apparatus comprising:
an outputting unit configured to output an image included in a multi-image file, the multi-image file including a first image and a second image that is not the first image, the first image being recognizable to an image processing apparatus, and the second image being unrecognizable to the image processing apparatus due to a current position of the second image in the multi-image file; and
a control unit configured to, in a case where an output instruction for said outputting unit to output the second image is accepted, automatically replace the first image with the second image in the multi-image file for the image processing apparatus to recognize the second image.

2. A management apparatus according to claim 1, further comprising a setting unit configured to set whether or not to replace the first image with the second image, wherein,
in a case where it is set by said setting unit to replace the first image with the second image, said control unit replaces the first image with the second image, and
in a case where it is not set by said setting unit to replace the first image with the second image, said control unit does not replace the first image with the second image.

3. A management apparatus according to claim 1, wherein said control unit replaces the first image with the second image after saving the first image.

4. An image processing apparatus according to claim 1, wherein the multi-image file includes an index area for the second image, and the index area is located after the first image and before the second image in the multi-image file.

5. A control method for controlling a management apparatus, comprising:
outputting an image included in a multi-image,
the multi-image file including a first image and a second image that is not the first image, the first image being recognizable to an image processing apparatus, and the second image being unrecognizable to the image processing apparatus due to a current position of the second image in the multi-image file; and
automatically replacing, in a case where an output instruction for outputting the second image has been accepted, the first image with the second image for the image processing apparatus to recognize the second image.

6. A non-transitory computer-readable recording medium for storing a computer-executable program for causing a computer to execute a method, said method comprising:
outputting an image included in a multi-image file, the multi-image file including a first image and a second image that is not the first image, the first image being recognizable to an image processing apparatus, and the second image being unrecognizable to the image processing apparatus due to a current position of the second image in the multi-image file; and
automatically replacing, in a case where an output, for outputting the second image has been accepted, the first image with the second image for the image processing apparatus to recognize the second image.

7. An management apparatus comprising:
an outputting unit configured to output an image included in a multi-image file,
which includes a first image and a second image that is not the first image, the first image being recognizable to an image processing apparatus, and the second image being unrecognizable to the image processing apparatus due to a current position of the second image in the multi-image file; and
a control unit configured to, in a case where an output instruction for the
outputting unit to output the second image has been accepted, automatically swap the first image and the second image.

* * * * *